Aug. 28, 1934.  W. SHURTLEFF  1,971,356
VENTILATING UNIT
Filed Aug. 26, 1931   2 Sheets-Sheet 1

Inventor:
Wilfred Shurtleff
By: George D. Haight Atty.

Aug. 28, 1934.  W. SHURTLEFF  1,971,356
VENTILATING UNIT
Filed Aug. 26, 1931   2 Sheets-Sheet 2

Inventor:
Wilfred Shurtleff
By: George I. Haight Atty.

Patented Aug. 28, 1934

1,971,356

UNITED STATES PATENT OFFICE 1,971,356

VENTILATING UNIT

Wilfred Shurtleff, Moline, Ill., assignor to The Herman Nelson Corporation, Moline, Ill., a corporation of Illinois Application August 26, 1931, Serial No. 559,516

6 Claims. (Cl. 98—94)

My invention relates to an improved unit ventilator for rooms, buildings and isolated occupied spaces.

My invention is embodied in a structure which is arranged for recirculating indoor air and introducing outdoor air into the room in controllable relation to maintain a substantially uniform temperature within the room or space.

In the application of Gerald E. Otis, Serial No. 550,071, filed July 11, 1931, patented June 13, 1933, Patent No. 1,913,681, a method of heating and ventilating is provided for maintaining a uniform degree of temperature and air motion in isolated spaces under varying weather conditions and the effects of occupancy. This method employs controllable artificial heating and cooling means and regulates the same so that they will serve as required to counterbalance the resultant effect of occupancy and the weather. The occupants themselves, sunshine, lighting and power devices, act as independent heating agencies, whereas, the outdoor temperature may have either a heating or cooling effect, depending upon the weather. Whenever the combined effects of the various independent heating and/or cooling agencies are such that the temperature of the room concerned tends to drop below that desired, artificial heating means are employed to maintain equilibrium, and when the net results of the various independent effects tends to raise the room temperature above the desired point, the artificial cooling means are brought into play.

The structure in which my invention is embodied is especially adaptable in carrying out the air-conditioning method referred to, for the reason that it produces air motion by recirculation of indoor air and introduction of outdoor air in regulated relation for cooling purposes, and while it is preferably adapted for use in conjunction or association with artificial heating means in the carrying out of said method, the structure may be used as the recirculating and cooling device for counterbalancing or regulating the independent heating effects of occupancy, or, further, it may be employed independently as a ventilating unit. While the construction herein shown is similar to that shown in my co-pending application, Serial No. 525,371, filed May 26, 1931, it should be noted that the present device has to do with the details of ventilator construction, whereas the above noted application has to do with a method of conditioning air within a room by the actinic rays of the sun.

An object of the invention is to provide a unitary structure of the character referred to, which is adaptable for mounting in an upper window frame to utilize the window opening as an inlet for outdoor air, provision being made so that the structure will not materially restrict the admission of daylight illumination through the upper portion of the window in which the structure is positioned.

Other objects of the invention will appear hereinafter.

Referring to the drawings.

Figure 1:
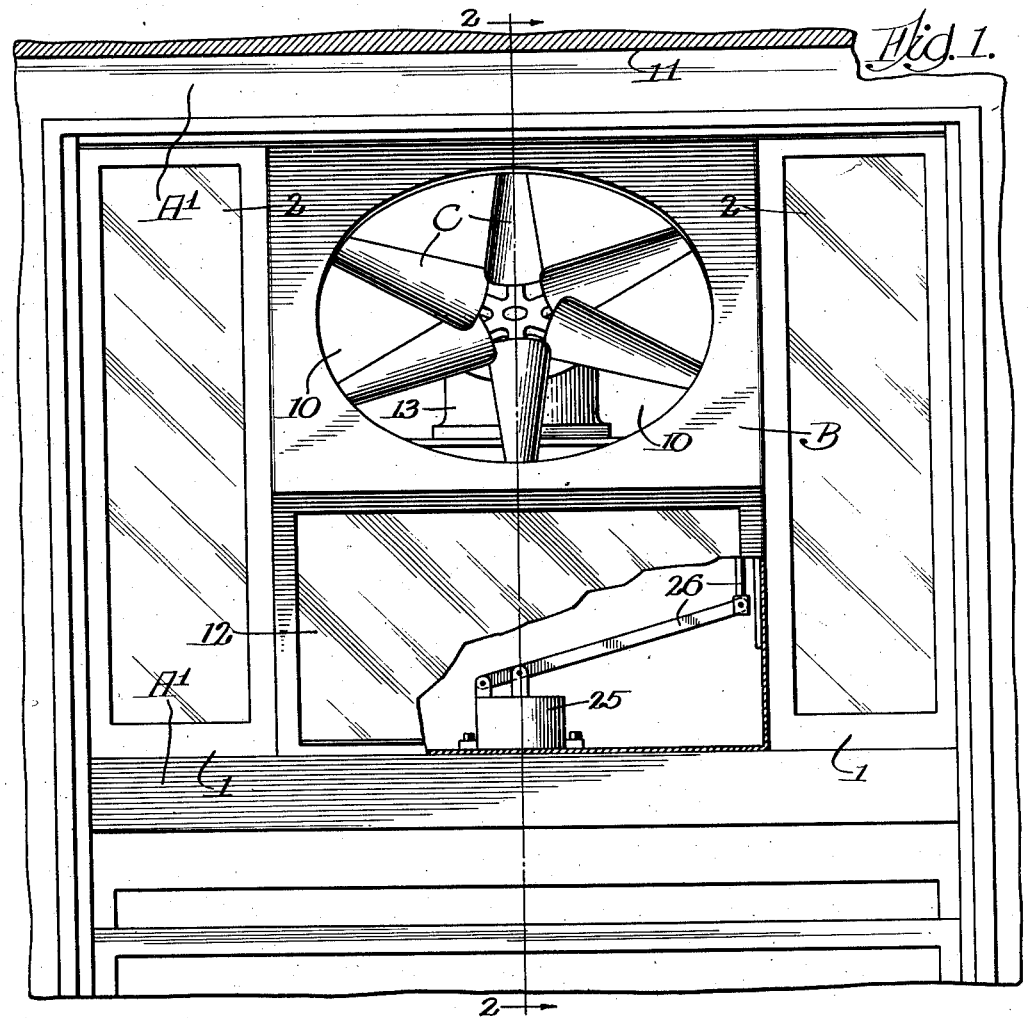
Fig. 1 is a view in front elevation of a ventilating unit embodying my invention, installed in position in the upper part of a window frame.

The structure shown in the drawings is designed to fit within the upper frame A' of a window in the wall of a room or space A, so that the window opening serves as the outdoor air inlet, thus obviating the necessity of providing a special air inlet in the wall of the room.

The whole unit, which is arranged within a cabinet or housing, need not be as wide as the usual window opening, hence the space on each side of the cabinet B can be filled in with panels comprising frames 1 having window glass 2 to provide for daylight illumination.

The housing or cabinet is preferably made of sheet metal and is rectangular in form to fit in the upper frame of the window in the space between the two glass panels just referred to. The cabinet has vertical side walls 5 in parallel relation to each other. The top and bottom horizontal walls 6 and 7 are parallel and sufficient in depth to extend inwardly beyond the window frame margins for convenience in adapting the cabinet to the window frame. The front wall of the cabinet is formed in two parts, 8 and 9, which extend from the inner edges of the bottom and top walls and are obliquely disposed so that they converge to a meeting point at some distance inwardly from the window. The side walls 5 are of substantially triangular formation to conform to the converged relation of the sections of the front wall.

The purpose of arranging the walls in the manner described is to provide an air outlet opening 10 into the room directed obliquely upward toward the ceiling 11 of the room, and to enable the lower section 9 to be made of window glass 12 so that daylight illumination will not be materially reduced.

A circulating fan C is disposed within the cabinet and positioned adjacent the discharge outlet 10 to draw air through the cabinet and discharge it obliquely toward the ceiling of the room. The fan is driven by an electric motor 13 which is supported on the cross members 14, these members being disposed transversely of the cabinet and secured at their downturned ends 15 to the side walls of the cabinet.

Each of the side walls 5 is provided with two segmental recirculating openings 16 which communicate with the interior of the room for the admission of air to the cabinet from the room interior. The admission of air to these inlet openings is regulated by segment-shaped vanes 18 or dampers which are disposed parallel with and adjacent to the vertical side walls and which are arranged to swing about horizontal pivots 19 to effectively cover any proportion of the inlet openings 16 desired in the operation of the structure.

Figure 3:
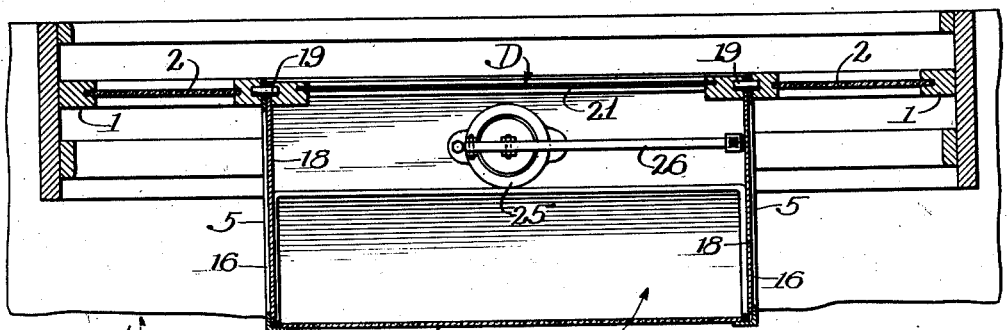
Fig. 3 is a diagonal plan section on the line 3—3 of Fig. 2.
Figure 2:
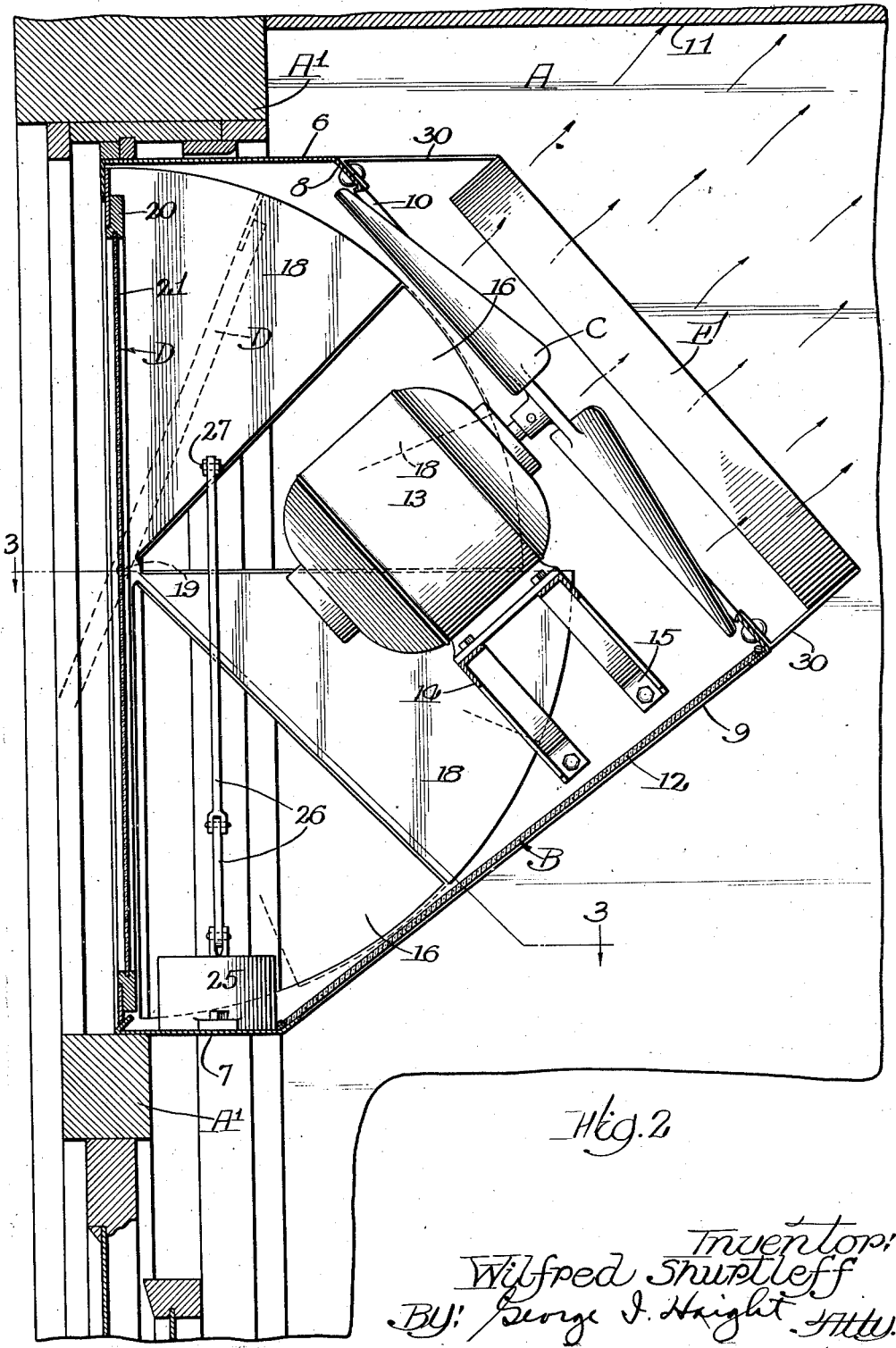
Fig. 2 is a vertical section of the structure on the line 2—2 of Fig. 1.

The admission of outdoor air through the window opening which forms the outdoor air inlet is regulated by a damper which extends over the entire expanse of said opening and which is likewise pivoted at 19 to the window frame to swing in a vertical plane, as indicated by the dotted lines of Fig. 2. In practice, this outdoor air damper D preferably comprises the upper sash of the window and is made up of a marginal frame 20 in which is mounted a glass panel 21 which provides for illumination to the same extent that a normal upper window sash would. The marginal frame 20 carries the two pivot pins 19, Fig. 3, the bearings for which are provided in the frame 1 of the side panels.

The outdoor air damper and the recirculating vanes or dampers are adapted to be swung in unison about their pivots, and for this reason the vanes 18 may be secured to and carried by the marginal frame 20 of the outdoor damper; thus the circulating dampers 18 are moved to close the recirculating inlet openings 16 as the outdoor damper is opened, and vice versa.

While it is practicable to manipulate these dampers manually to control the admission of outdoor air and the recirculation of indoor air, it is preferable to place them under the control of a suitable thermostat within the room, especially when the unit is used in conjunction with the room heating means for conditioning the room temperature in accordance with the Otis method hereinbefore referred to. Any suitable or well known control means may be provided for this purpose. In the drawings I have indicated an air motor 25 mounted on the lower wall of the cabinet and connected by the linkage 26 to one of the upper recirculating dampers 18, this linkage being pivotally connected at 27 to said damper as shown more clearly in Fig. 2. The motor may be of the usual type operated by air pressure under control of the room thermostat, and through the medium of the linkage will operate the dampers to regulate the outdoor air inlet and recirculating inlets in accordance with requirements.

The structure described is particularly advantageous because it is comparatively inexpensive to manufacture and because it does not require any special provision for installation. It is made to fit the upper portion of the usual window openings of the room without obstructing the illumination through this portion of the window to any material extent. The unit is so arranged that the discharge of air by the fan through the discharge outlet of the cabinet is directed obliquely toward the ceiling and is therefore not conducive to drafts, but, on the other hand, brings about the complete circulation of air within the room and the thorough admixture of the outdoor air with the recirculated air when the outdoor air damper is open to admit outdoor air for cooling purposes. If desired, the air from the discharge opening may be cleaned by means of a filter positioned adjacent said discharge opening. This filter E may be of any suitable type for the purpose and, as shown in Fig. 2, is supported by the arms or members 30 outstanding from the cabinet walls. The filter is preferably mounted in this position so that access may be readily had to it for cleaning purposes.

While the structure shown in the drawings illustrates one embodiment of the invention, it is obvious that changes may be made in the construction, arrangement and operation of the parts, without departing from the spirit of the invention, and I contemplate such changes as fairly fall within the scope of the appended claims.

I claim:

1. In a ventilator unit of the character described, the combination of a cabinet having an outdoor air inlet in its rear wall and having vertical side walls with air inlet openings therein, and means forming a front wall for the cabinet comprising two sections angularly disposed and converging together, the upper of said sections having an air discharge outlet directed toward the room ceiling when the unit is in normal operating position and the lower of said sections, having glass therein for illumination purposes, and a damper for said outdoor air inlet opening having glass therein to form a window for illumination purposes.

2. In a ventilator unit of the character described, the combination of a cabinet having an outdoor air inlet in its rear wall and having vertical side walls with air inlet openings therein, and means forming a front wall for the cabinet comprising two sections angularly disposed and converging together, the upper of said sections having an air discharge outlet directed toward the room ceiling when the unit is in normal operating position and the lower of said sections having glass therein for illumination purposes, a damper for said outdoor air inlet opening having glass therein to form a window for illumination purposes, movable segmental dampers in said cabinet for controlling the inlet openings in the side walls thereof, and a motor driven fan mounted within the cabinet adjacent said discharge outlet.

3. In a ventilator unit of the class described, the combination of a cabinet having an opening in its rear wall, and side walls extending at right angles to the rear wall and having segmental openings therein, a damper pivotally mounted to swing in a vertical plane to control the admission of air through the rear wall inlet, segmental wings extending at right angles to said damper parallel with the side walls and movable with said damper to control the admission of air through said segmental openings, a motor, means connecting said motor with said damper for moving the damper and wings in unison, means forming a discharge opening in the front wall of the cabinet, and a fan within the cabinet adjacent said discharge opening.

4. In an apparatus of the class described, the combination of a housing comprising a rectangular air inlet portion having flat side walls and flat top and bottom walls affording a structure adapted to fit within the upper sash opening of a window, the rectangular air inlet portion merging into a body portion having side walls constituting extensions of the first mentioned side walls and obliquely disposed top and bottom walls outwardly converging toward one another, the top wall being provided with a discharge opening, a motor supported near the center of the body portion and having an obliquely disposed shaft extending normal to the plane of the discharge opening, and a fan carried by the shaft and operating within a plane of rotation parallel to the plane of the discharge opening for discharging air obliquely upwardly therethrough.

5. In an apparatus of the class described, the combination of a housing comprising a rectangular air inlet portion having flat side walls and flat top and bottom walls affording a structure adapted to fit within the upper sash opening of a window, the rectangular air inlet portion merging into a body portion having side walls constituting extensions of the first mentioned side walls and obliquely disposed top and bottom walls outwardly converging toward one another, the top wall being provided with a discharge opening and the bottom wall being transparent to provide for the admission of light, a motor supported near the center of the body portion and having an obliquely disposed shaft extending normal to the plane of the discharge opening, and a fan carried by the shaft and operating within a plane of rotation parallel to the plane of the discharge opening for discharging air obliquely upwardly therethrough.

6. In an apparatus of the class described, the combination of a housing comprising a rectangular air inlet portion having flat side walls and flat top and bottom walls affording a structure adapted to fit within the upper sash opening of a window, the rectangular air inlet portion merging into a body portion having side walls constituting extensions of the first mentioned side walls and obliquely disposed top and bottom walls outwardly converging toward one another, the top wall being provided with a discharging opening, a motor supported near the center of the body portion and having an obliquely disposed shaft extending normal to the plane of the discharge opening, and a fan carried by the shaft and operating within a plane of rotation parallel to the plane of the discharge opening for discharging air obliquely upwardly therethrough, the body portion being provided with an interior-air inlet port, means for controlling the admission of air through the window opening, and means for controlling the admission of air through the body port.

WILFRED SHURTLEFF.